(12) United States Patent
Goldberg et al.

(10) Patent No.: US 10,175,476 B2
(45) Date of Patent: Jan. 8, 2019

(54) SOLID IMMERSION MICROSCOPY SYSTEM WITH DEFORMABLE MIRROR FOR CORRECTION OF ABERRATIONS

(71) Applicant: TRUSTEES OF BOSTON UNIVERSITY, Boston, MA (US)

(72) Inventors: Bennett B. Goldberg, Newton, MA (US); Thomas Bifano, Mansfield, MA (US); Selim M. Unlu, Jamaica Plain, MA (US); Euan Ramsay, Dublin, CA (US); Fatih Hakan Koklu, Sunnyvale, CA (US); Jerome Mertz, Cambridge, MA (US); Yang Lu, Boston, MA (US); Abdulkadir Yurt, Brighton, MA (US); Christopher Stockbridge, Natick, MA (US)

(73) Assignee: Trustees of Boston University, Boston, MA (US)

( * ) Notice: Subject to any disclaimer, the term of this patent is extended or adjusted under 35 U.S.C. 154(b) by 216 days.

(21) Appl. No.: 14/414,919

(22) PCT Filed: Jul. 15, 2013

(86) PCT No.: PCT/US2013/050453
§ 371 (c)(1),
(2) Date: Jan. 15, 2015

(87) PCT Pub. No.: WO2014/014805
PCT Pub. Date: Jan. 23, 2014

(65) Prior Publication Data
US 2015/0185474 A1 Jul. 2, 2015

Related U.S. Application Data

(60) Provisional application No. 61/671,986, filed on Jul. 16, 2012.

(51) Int. Cl.
*G02B 21/00* (2006.01)
*G02B 27/00* (2006.01)
(Continued)

(52) U.S. Cl.
CPC ..... *G02B 27/0068* (2013.01); *G02B 21/0016* (2013.01); *G02B 21/0048* (2013.01);
(Continued)

(58) Field of Classification Search
CPC .... G02B 21/0016; G02B 21/16; G02B 21/33; G02B 26/06; G02B 21/002;
(Continued)

(56) References Cited

U.S. PATENT DOCUMENTS 5,777,719 A * 7/1998 Williams ............... A61B 3/156
351/200
6,229,600 B1 * 5/2001 Martynov .......... G02B 27/0025
356/123

(Continued)

FOREIGN PATENT DOCUMENTS

JP 2009-170011 7/2009

OTHER PUBLICATIONS

Goldberg et al., "Chromatic and spherical aberration correction for silicon aplanatic solid immersion lens for fault isolation and photon emission microscopy of integrated circuits", Aug. 4, 2011, Microelectronics Reliability, Elsevier, pp. 1637-1639.*
(Continued)

*Primary Examiner* — William R Alexander
*Assistant Examiner* — Balram T Parbadia
(74) *Attorney, Agent, or Firm* — Preti, Flaherty, Beliveau & Pachios LLP

(57) ABSTRACT

A system and method for correction of aberrations in a solid immersion microscopy system using a deformable mirror. A solid immersion lens is provided having a surface configured
(Continued)

to make optical contact with a nearly planar surface of a substrate, an object to be imaged disposed on the opposite side of the substrate. A convex surface of the solid immersion lens faces an objective lens. A deformable mirror assembly, including a plurality of individually controllable actuators, receives light transmitted from the object. A control system in communication with the deformable mirror assembly provides individual actuation of each of the actuators of the deformable mirror to compensate or counteract the effects of aberrations.

20 Claims, 2 Drawing Sheets

(51) Int. Cl.
*G02B 21/33* (2006.01)
*G02B 21/04* (2006.01)
*G02B 21/06* (2006.01)
*G02B 26/08* (2006.01)

(52) U.S. Cl.
CPC ......... *G02B 21/0056* (2013.01); *G02B 21/04* (2013.01); *G02B 21/06* (2013.01); *G02B 21/33* (2013.01); *G02B 26/0825* (2013.01); *G02B 26/0841* (2013.01)

(58) Field of Classification Search
CPC ............ G02B 21/0048; G02B 21/0072; G02B 21/0076; G02B 21/04; G02B 21/06; G02B 26/0825; G02B 26/0841; G02B 27/0068; G02B 21/00
See application file for complete search history.

(56) References Cited

U.S. PATENT DOCUMENTS

| | | | | |
|---|---|---|---|---|
| 6,441,359 | B1* | 8/2002 | Cozier | B82Y 20/00 250/216 |
| 7,576,308 | B1* | 8/2009 | Gruneisen | G02B 26/0825 250/201.9 |
| 2005/0190436 | A1 | 9/2005 | Terada et al. | |
| 2006/0007436 | A1* | 1/2006 | Kurosawa | G01N 21/47 356/237.4 |
| 2006/0071143 | A1* | 4/2006 | Saggau | G02B 21/002 250/201.3 |
| 2007/0007428 | A1* | 1/2007 | Ri | G02B 21/006 250/201.3 |
| 2008/0225230 | A1* | 9/2008 | Saito | A61B 3/1015 351/206 |
| 2008/0239298 | A1* | 10/2008 | Tobiason | G01B 11/26 356/121 |
| 2009/0027769 | A1* | 1/2009 | Saito | G02B 9/60 359/385 |
| 2009/0137990 | A1 | 5/2009 | Sheinis | |
| 2009/0168152 | A1* | 7/2009 | Gelernt | G02B 21/16 359/353 |
| 2010/0053599 | A1* | 3/2010 | Milster | G01J 3/02 356/51 |
| 2012/0002163 | A1* | 1/2012 | Neal | G02B 3/0087 351/201 |
| 2012/0257196 | A1* | 10/2012 | Raicu | G02B 21/002 356/300 |
| 2013/0016178 | A1* | 1/2013 | Birkbeck | H04N 5/2254 348/36 |

OTHER PUBLICATIONS

Goldberg, B.B. et al., "Chromatic and spherical aberration correction for silicon aplanatic solid immersion lens for fault isolation and photon emission microscopy of integrated circuits," Microelectronics Reliability, vol. 51, Aug. 4, 2011, pp. 1637-1639.

Lu, Y. et al., "Spherical aberration correction in aplanatic solid immersion lens imaging using a MEMS deformable mirror," Microelectronics Reliability, vol. 52, Jul. 7, 2012, pp. 2120-2122.

Morzinski, K. et al., "The open-loop control of MEMS: Modeling and experimental results," Proc. of SPIE vol. 6467, 64670G-1-64670G-10, (2007).

Diouf, A. et al., "Open-loop shape control for continuous microelectromechanical system deformable mirror," Applied Optics, vol. 49, No. 31, Nov. 1, 2010, pp. G148-G154.

Vogel, C. et al., "Modeling and parameter estimation for point-actuated continuous-facesheet deformable mirrors," J. Opt. Soc. Am. A, vol. 27, No. 11, Nov. 2010, pp. A56-A63.

Stewart, J. et al., "Open-loop control of a MEMS deformable mirror for large-amplitude wavefront control," J. Opt. Soc. Am A, vol. 24, No. 12, Dec. 2007, pp. 3827-3833.

* cited by examiner c SIL a SIL

SOLID IMMERSION MICROSCOPY SYSTEM WITH DEFORMABLE MIRROR FOR CORRECTION OF ABERRATIONS

STATEMENT REGARDING FEDERALLY SPONSORED RESEARCH OR DEVELOPMENT

This invention was made with Government Support under Contract No. FA8650-11-C-7102 awarded by the Air Force Research Lab. The Government has certain rights in the invention.

CROSS-REFERENCE TO RELATED APPLICATIONS

N/A

BACKGROUND OF THE INVENTION

Solid immersion lenses (SILs) are used in semiconductor failure analysis to increase the resolution and signal collection of optical microscopes for backside photon-based imaging and failure analysis techniques. The improvement in resolution allows optical techniques to be extended to the most modern devices, where the features are sufficiently small that they cannot be imaged without an immersion lens. These lenses are currently incorporated into commercial failure analysis equipment.

When imaging with an immersion lens many factors lead to aberrations, such as off-axis imaging, errors in fabrication of the surfaces, and an unknown thickness of the substrate and distance from back surfaces to transistor or other device level. Since spherical aberration free imaging is only possible if the region of interest sits at the center or aplanatic point of the SIL, any mismatch between the design thickness or other variable and the actual thickness or other variable of the substrate or other element in the light path will rapidly cause an increase in the focus spot size.

SUMMARY OF THE INVENTION

A microscopy system for aberration correction is provided, particularly for the application of commercial semiconductor failure analysis and semiconductor fabrication quality control. The microscopy system incorporates a solid immersion lens for imaging an object, such as a semiconductor, and a deformable mirror (DM) to compensate for aberrations.

DESCRIPTION OF THE DRAWINGS

The invention will be more fully understood from the following detailed description taken in conjunction with the accompanying drawings in which.

DETAILED DESCRIPTION OF THE INVENTION

Figure 1A:
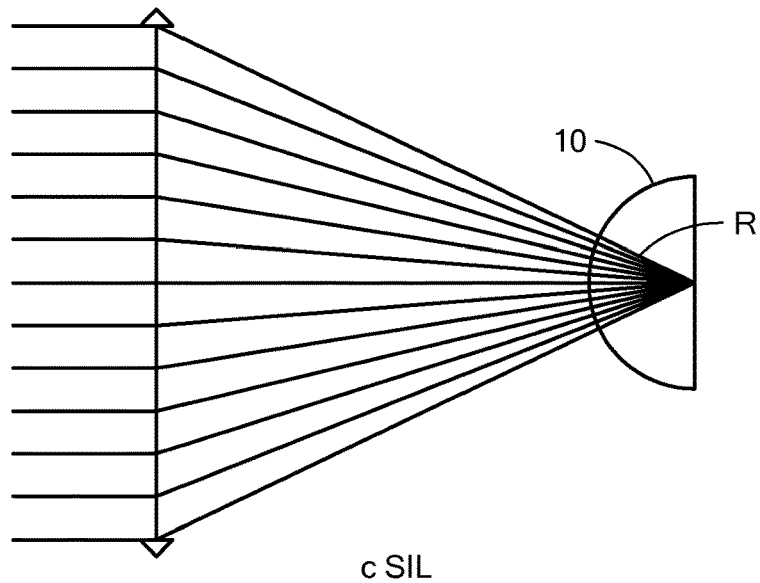
FIG. 1A is an illustration of a central solid immersion lens (cSIL) configuration, where light rays follow the radii to focus at the center of the lens.
Figure 1B:
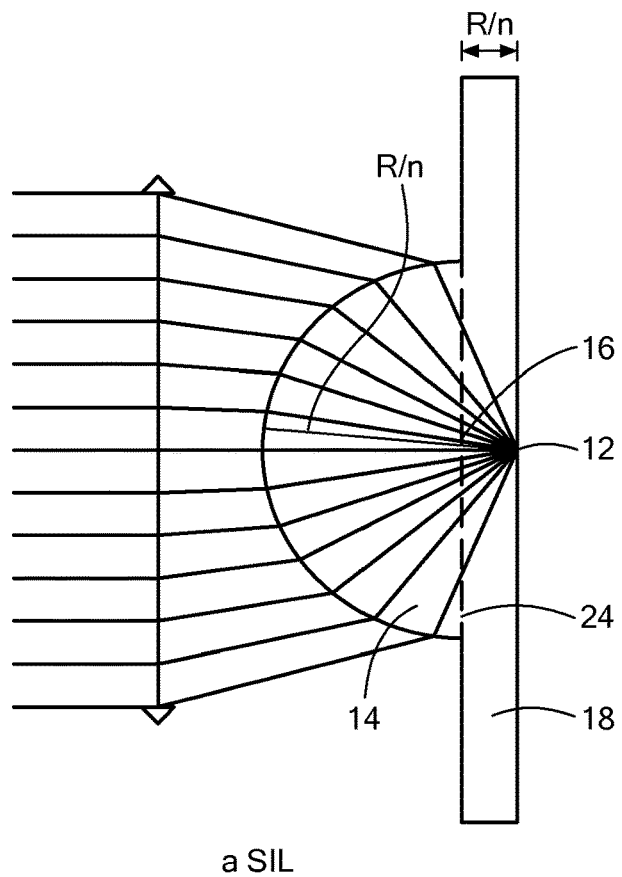
FIG. 1B is an illustration of an aplanatic solid immersion lens (aSIL) configuration, where light rays refract at the curved surface, focusing to the aplanatic point, a distance R/n below the center of the immersion lens, where R is the radius and n the index; the aSIL has a larger numerical aperture (NA) allowing potentially higher resolution.

Solid immersion lenses (SILs) are generally of a plano-convex design, with the planar surface sitting in optical contact with the substrate of the device under test (DUT) and the convex surface facing the backing objective in the imaging system. Variations of this basic design include shaped surfaces (for example, slightly convex, toroidal, etc.) rather than a planar surface for the SIL surface that contacts the substrate. Two types of SIL geometry are illustrated in FIGS. 1A and 1B. Both of these types allow the possibility to perform aberration-free imaging. The first type, in FIG. 1A, known as a central SIL (cSIL), images light at the center of the radius R of curvature of the immersion lens 10. That is, the light rays follow the radii to focus at the center of the lens. The second type, in FIG. 1B, known as an aplanatic SIL, images light at the aplanatic point 12 of the immersion lens 14, a distance R/n below the center 16 into the substrate 18, where n is the refractive index. That is, light rays refract at the curved surface, focusing to the aplanatic point, a distance R/n below the center of the immersion lends. In a perfect, on-axis, model system, both designs are aberration free. The aplanatic SIL (aSIL) also has a larger numerical aperture (NA), allowing potentially higher resolution. This aSIL is often referred to as a numerical aperture increasing lens, or NAIL.

A SIL is used generally to increase the microscope NA, which in turn yields better potential resolution. And while the cSIL and aSIL can theoretically produce aberration free images at one point in the DUT, they are extremely susceptible to optical performance degradation due to errors in the SIL geometry or due to imaging at points on the DUT other than the optimal point, since the impact of aberrations scales with the optical system's numerical aperture, NA. Since the general purpose of microscopy is to image over a field-of-view that exceeds one point, the effect of aberrations in high-NA imaging can be significant, and can degrade image quality severely.

When imaging a DUT with an immersion lens of either central or aplanatic type, many factors can lead to aberrations: off-axis imaging, errors in fabrication of the surfaces, and an unknown thickness of the substrate and distance from back surface to the object plane to be imaged. Since aberration-free imaging is only possible if the region of interest sits at the center or aplanatic point of the SIL, any mismatch between the thickness for which the SIL is designed and the actual thickness of the substrate causes an increase in the aberrations present and hence increases the focused spot size.

On axis aberrations include defocus and spherical aberrations. Off-axis aberrations include astigmatism, coma, trefoil, and other higher order aberrations. Aberrations can also arise from differences between the refractive index of the substrate of the DUT and the refractive index of the SIL. Aberrations can be introduced by imperfections in the silicon substrate, for example, densification and rarification of the substrate when polished. Errors in the alignment or positioning of other optical components in the microscope can introduce aberrations. Other aberrations due to imperfections in the SIL manufacturing process, such as asphericity, can arise. Those of skill in the art will recognize that aberrations are not limited to these just discussed.

Another source of aberrations is the shape of the SIL itself. In the cSIL geometry, there is little or no refraction on the steeply sloped convex surface, making that system less susceptible to optical errors due to shape errors. However, in aSIL geometry, substantial refraction at the convex surface makes that system more susceptible to wavefront distortion due to aSIL shape errors.

As an example, the utility of a solid immersion lens (SIL) in semiconductor failure analysis can be hindered if the device under test (DUT) is not prepared to a sufficient accuracy. In particular, the area of interest inside a flip-chip packaged integrated circuit is typically buried beneath 100 µm or more of silicon substrate. Each immersion lens is designed to operate with a specific substrate thickness. If the device is not prepared in such a way that the substrate thickness matches the design thickness of the lens, then the best resolution will not be achieved. Accordingly, a deformable mirror is used in the microscopy system to compensate for this mismatch between the design thickness and the actual thickness. By reshaping the illumination light beam used to image the device it is possible to correct for this mismatch and recover most, if not all, of the resolution.

Figure 2:
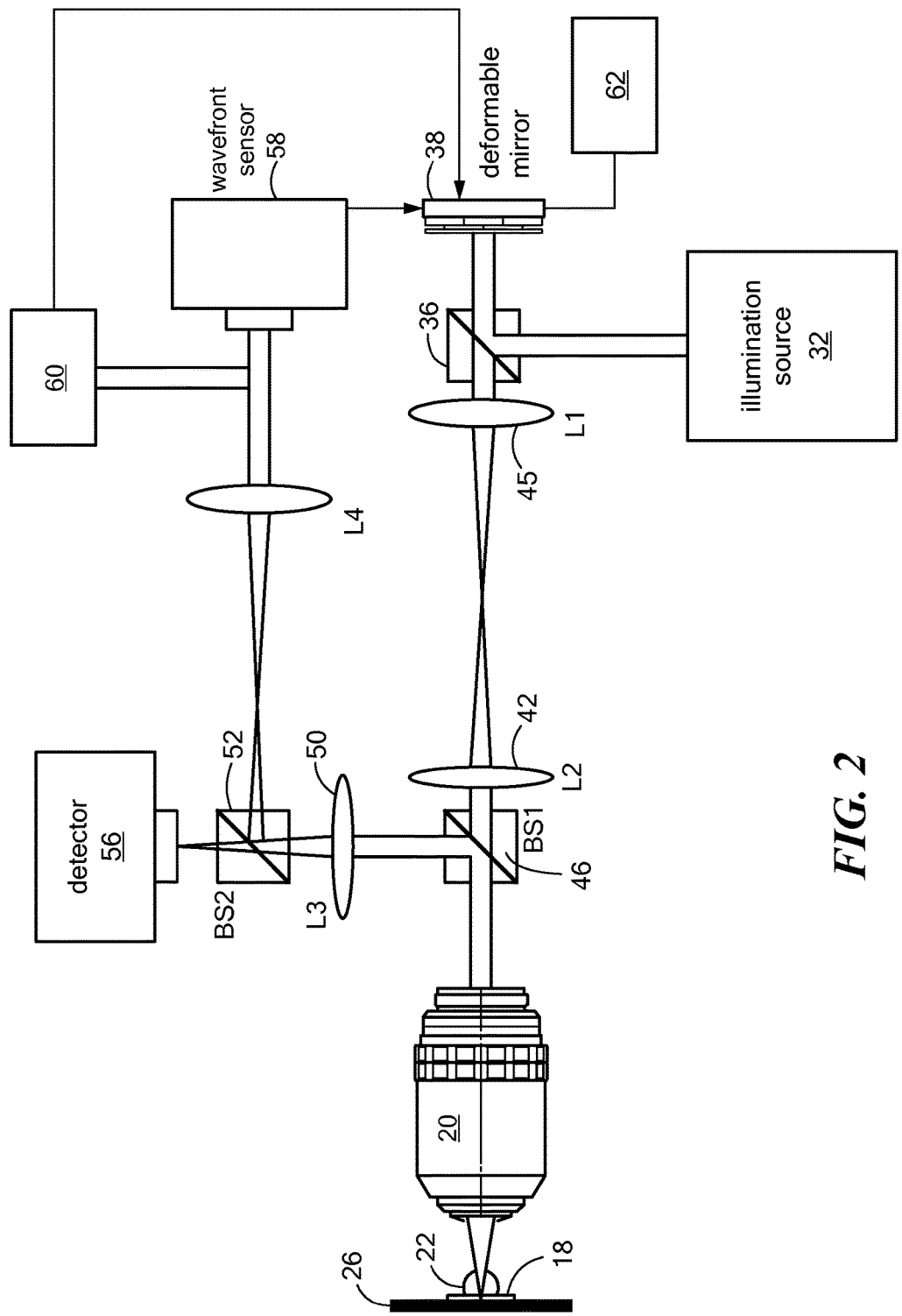
FIG. 2 is a schematic diagram of one embodiment of a solid immersion microscopy system with a deformable mirror assembly; many alternate configurations are possible, which would in general also include a beam scanner system as known in the art.

Referring to FIG. 2, one embodiment of a microscopy system includes an objective lens assembly 20 and a planoconvex aplanatic solid immersion lens (aSIL) 22. The planar side 24 (FIG. 1B) of the aSIL is placed on an object 18, the device under test, such as a silicon chip, which is supported against a mirror or other reflective backing 26.

In the configuration shown, a collimated coherent laser illumination beam 30 from an illumination source 32 via a beam splitter 36 is incident on a deformable mirror (DM) 38. The plane of the DM is reimaged with a lens pair 40 and 42 (L1 and L2) onto the pupil plane of the objective lens assembly 20. It is possible to position the DM elsewhere, but positioning it in a plane conjugate to the objective lens pupil is generally preferred in adaptive optics systems because it allows the most straightforward implementation of control. The objective lens 20 focuses the beam 44 from lens 42 and beam splitter 46 through the aSIL 22 and the backside of the silicon substrate 18 onto the plane of the semiconductor structures that are to be imaged therein. The focused illumination spot 12 reflects back through the objective lens 20 and is partially reflected by the beam splitter 46 (BS1) through a lens 50 (L3) and beam splitter 52 forming an image on a photonic detector 56, such as a CCD camera or photomultiplier or other photosensitive device. Part of the beam is redirected by a beam splitter 52 (BS2) and another lens 54 (L4) to a wavefront sensor 58 (WFS) that is conjugate to both the plane of the DM and the pupil of the objective lens 20. In this configuration the WFS 58 can measure any wavefront distortion in the system due to aberrations, and the DM 38 can pre-compensate those distortions either with sensor feedback (i.e. closed loop control) or without it (open loop control). In the former case, the feedback can be provided by the wavefront sensor 58 or by another detector 60 in the image plane that measures resolution, contrast, or some other indicator of the quality of the image or the scanned focal spot. The corrections are made on each of the controllable elements of the DM using information from corresponding areas in the wavefront sensor 58. In the latter case, the DM control can be based on some known information about the aberrations, such as the presence of first-order spherical aberration due to substrate thickness errors, or the presence of astigmatism due to off-axis imaging. Again, control is on an element-by-element basis. Typically the number of elements can be any desired. Actual experimental DMs have had 140 controllable elements. The SIL and the other lenses in the system can be fabricated from any suitable optical material.

Any suitable illumination source 32 can be used, generally as determined by the application. The illumination is typically in the visible or infrared range. The illumination source may be a laser coupled via an optical fiber to a collimating lens, or as shown in FIG. 2, a source such as a laser of collimated light. In some cases, illumination would not be required and the image could be formed from light emitted by the object itself. For those cases, the DM 38 would be positioned downstream of the objective lens pupil, typically in a conjugate plane with that pupil and the WFS 58.

The DM 38 can have a segmented or continuous mirror surface. In one embodiment, the deformable mirror assembly is a continuous face-sheet microelectromechanical system (MEMS) having an array of deformable mirror elements or actuators. The mirror elements are individually actuatable by electrostatic forces. Suitable MEMS deformable mirrors are commercially available from Boston Micromachines Corporation. The various parameters, such as pitch or center-to-center distance between actuators, stroke, number of actuators, response time, and size of the array, can be selected based on the application.

In one embodiment, suitable for imaging a silicon chip of 100 µm thickness, a DM 38 with 140 electrostatic actuators is used. The deformable mirror includes actuators capable of 5.5 µm stroke, oriented in a square array on 400 µm pitch between actuators. Other DMs, including those with piezoelectric, magnetic, and thermal actuation schemes can be used, and more or fewer actuators on various pitches are possible. For this application the dominant aberrations are likely to be spherical aberration, astigmatism, coma, and trefoil (i.e., relatively low order optical aberrations). In another embodiment, a DM can be specifically designed to compensate anticipated aberrations, with actuators oriented in circular or other geometries to better match the known effects of such aberrations on wavefront distortion. For example, a DM with several ring-shaped actuators could efficiently control spherical aberrations with fewer degrees of freedom than a DM with actuators oriented in a square grid.

In one embodiment, to control wavefront distortion, the deformable mirror 38 is controlled in an open-loop fashion, using techniques developed previously by Diouf et al. (Diouf, A., LeGendre, A. P., Stewart, J. B., Bifano, T. G., Lu, Y., "Open-loop shape control for continuous microelectromechanical system deformable mirror." *Applied Optics*, Vol. 49, No. 31 (2010), pp 148-154.) (Appendix A). With this control approach, arbitrary shapes can be made on the DM, with shape errors typically less than 25 nm rms. This approach could be used, for example, to control aberrations due to substrate thickness errors. Such errors are common, as it is often difficult to produce a substrate of precisely the desired thickness. Moreover, it is sometimes required that images be made of several different layers in a substrate. There is only one plane at which a SIL-based image will be aberration free. Such substrate thickness errors will result in spherical aberration, and the effect of this aberration on wavefront is well-known. Thus, if the substrate thickness errors can be measured, the DM can be shaped appropriately to counteract expected wavefront distortion without any real-time feedback.

In another embodiment, to control wavefront distortion, the deformable mirror is controlled in an closed-loop fashion. Known adaptive optics techniques can suitably be used.

As one with familiarity in adaptive optics would know, the standard closed loop approach is to build an empirical reconstructor matrix to map wavefront sensor measurements to DM shapes in a pre-control calibration step, then iteratively measure WFS as input, and multiply the WFS input by the inverted reconstructor matrix to get an estimate of shape errors at the DM, then use integral control to update the DM outputs accordingly. With this control approach, shapes made on the DM 38 are prescribed using feedback from a wavefront sensor or an image quality metric or some other sensor indicative of the relative state of uncompensated aberrations in the optical system. An iterative controller 62 updates the DM repeatedly in an effort to optimize either the wavefront flatness or the image quality. Through this technique, wavefront errors can typically be reduced to a small fraction of the optical wavelength in amplitude.

A combined approach is also possible, in which open loop and closed loop control techniques are applied is series or in parallel.

With the present aberration correction system, semiconductor inspection systems and failure analysis systems can operate with chips of significantly higher complexity than is possible with prior art systems. Also, the present aberration correction system extends the abilities of imaging systems to resolve smaller feature sizes.

It will be appreciated that many other configurations of the optical system can be employed besides that shown in FIG. 2. The system also includes a beam scanner assembly, which for simplicity is not shown in FIG. 2. The system can also be used for other SIL microscopy applications in which it is required to image through a substrate many times thicker than the wavelength of the light used to generate an image, where the imaged features have dimensions measuring only a small fraction of the wavelength. Such applications are not restricted to semiconductor fabrication, but might also include biological imaging applications and subsurface imaging with optical wavelengths from millimeter to nanometer scales.

It will be appreciated that features of the various embodiments and examples described herein can be combined in different ways from those explicitly shown and described. The invention is not to be limited by what has been particularly shown and described, except as indicated by the appended claims.

What is claimed is:

1. A solid immersion microscopy system comprising:
   a light path configured to transmit illumination from an object to be imaged;
   an objective lens assembly disposed on the light path;
   a solid immersion lens disposed on the light path between the objective lens assembly and the object to be imaged, the solid immersion lens including a surface configured to make optical contact with a substrate, the object to be imaged disposed on an opposite side of the substrate, the solid immersion lens further including a convex surface facing the objective lens;
   a deformable mirror assembly on the light path to receive light transmitted from the object, the deformable mirror assembly comprising a mirror surface and a plurality of actuators, each actuator individually actuatable to act in concert to define a shape of the mirror surface, and
   a control system in communication with the deformable mirror assembly to provide individual actuation of each of the actuators so as to correct aberrations in the light transmitted from the object by actuation of the deformable mirror assembly to change the shape of the mirror surface, wherein the aberration is caused by the light transmitted from the object interacting with the solid immersion lens.

2. The system of claim 1, wherein the deformable mirror assembly comprises an electrostatically actuated microelectromechanical deformable mirror.

3. The system of claim 1, where the mirror surface of the deformable mirror assembly is segmented or continuous.

4. The system of claim 1, wherein the solid immersion lens comprises a central solid immersion lens.

5. The system of claim 1, wherein the solid immersion lens comprises an aplanatic solid immersion lens.

6. The system of claim 1, further comprising an illumination source disposed to transmit light onto the light path.

7. The system of claim 6, wherein the illumination source comprises a laser light source.

8. The system of claim 1, wherein the control system includes an open loop control configured to compensate predicted, modeled, or known aberrations.

9. The system of claim 1, wherein the control system includes a closed loop control configured to compensate unknown aberrations.

10. The system of claim 9, further comprising a sensor operative to measure wavefront or image quality, the sensor in communication with the control system to provide feedback for the closed loop control.

11. The system of claim 10, wherein the sensor comprises a wavefront sensor.

12. The system of claim 11, wherein the wavefront sensor is conjugate to both a plane of the deformable mirror assembly and a pupil of the objective lens assembly.

13. The system of claim 11, wherein the wavefront sensor is configured to measure any wavefront distortions in the system due to aberrations, and
   the control system is operative to pre-compensate for the wavefront distortion by actuation of the deformable mirror assembly.

14. The system of claim 11, wherein the deformable mirror assembly is located in a conjugate plane with a pupil of the objective lens assembly and the wavefront sensor.

15. The system of claim 1, wherein the plurality of actuators comprises a plurality of ring-shaped actuators.

16. The system of claim 1, wherein the plurality of actuators is oriented in a square grid.

17. A method for correcting aberrations in a solid immersion microscopy system, comprising:
   receiving light from a target substrate via an objective lens assembly;
   applying the received light to a deformable mirror assembly comprising plural controllable elements acting in concert to define a shape of a mirror surface; and
   controlling the controllable elements of the deformable mirror assembly to reduce aberrations in an image of the target substrate in the received light by changing the shape of the mirror surface, wherein the aberrations are caused by the light from the object interacting with the solid immersion lens.

18. The method of claim 17, further comprising controlling the controllable elements of the deformable mirror assembly based on known aberrations.

19. The method of claim 17, further comprising sensing aberrations in the received light and controlling the controllable elements of the deformable mirror assembly based on the sensed aberrations.

20. Apparatus for reducing aberration in a solid immersion lens imaging system, wherein:

light is received from a target substrate via an objective lens assembly;

the received light is applied to a deformable mirror assembly comprising plural controllable elements acting in concert to define a shape of a mirror surface; and control means is provided for adjusting the controllable elements to reduce aberrations in an image of the target substrate in the received light by changing the shape of the mirror surface, wherein the aberrations are caused by the light from the object interacting with the solid immersion lens.

\* \* \* \* \*